United States Patent
Hsu et al.

(10) Patent No.: US 8,107,378 B2
(45) Date of Patent: Jan. 31, 2012

(54) POWER MANAGING METHOD APPLIED TO A WIRELESS NETWORK APPARATUS AND POWER MANAGEMENT THEREOF

(75) Inventors: Chia-Hua Hsu, Hsinchu (TW); Yi-Hua Lu, Hsinchu County (TW); Geng-Shing Jou, Taoyuan County (TW); Ting-Yao Chiu, Taoyuan County (TW)

(73) Assignee: Realtek Semiconductor Corp., HsinChu (TW)

( * ) Notice: Subject to any disclaimer, the term of this patent is extended or adjusted under 35 U.S.C. 154(b) by 491 days.

(21) Appl. No.: 12/411,401

(22) Filed: Mar. 26, 2009

(65) Prior Publication Data

US 2009/0245152 A1    Oct. 1, 2009

Related U.S. Application Data

(60) Provisional application No. 61/040,155, filed on Mar. 28, 2008.

(30) Foreign Application Priority Data

Feb. 13, 2009   (TW) .............................. 98104646 A

(51) Int. Cl.
  *G06F 11/30*  (2006.01)
  *G08C 17/00*  (2006.01)
  *H04J 3/06*   (2006.01)
  *H04L 12/26*  (2006.01)
  *H01Q 11/12*  (2006.01)
  *H04B 1/38*   (2006.01)

(52) U.S. Cl. ........ 370/236; 370/311; 370/350; 370/450; 455/127.5; 455/574

(58) Field of Classification Search ....... 370/229–236.2, 370/310–350, 445–462; 375/222, 230; 455/13.4, 455/522, 574, 127.5, 343.2

See application file for complete search history.

(56) References Cited

U.S. PATENT DOCUMENTS

| | | | |
|---|---|---|---|
| 6,215,764 B1 * | 4/2001 | Wey et al. | 370/216 |
| 7,317,732 B2 * | 1/2008 | Mills et al. | 370/445 |
| 7,660,578 B2 * | 2/2010 | Viitamaki et al. | 455/426.2 |
| 2007/0082714 A1 | 4/2007 | Beach | |
| 2007/0287456 A1 * | 12/2007 | Shimizu | 455/435.1 |

FOREIGN PATENT DOCUMENTS

| | | |
|---|---|---|
| EP | 1 473 951 A2 | 11/2004 |
| EP | 1 684 466 A1 | 7/2006 |
| EP | 1 865 664 A2 | 12/2007 |
| GB | 2 436 661 A | 10/2007 |
| JP | 2005303822 A | 10/2005 |
| JP | 2007329696 A | 12/2007 |
| WO | 2008005943 A2 | 1/2008 |
| WO | 2008007512 A1 | 1/2008 |

* cited by examiner

*Primary Examiner* — Tri H Phan

(74) *Attorney, Agent, or Firm* — Winston Hsu; Scott Margo

(57) ABSTRACT

A power managing method applied to a wireless network apparatus includes the steps of periodically detecting whether the wireless network apparatus is operated in a non-link status to determine whether to enter a first power-saving mode when the wireless network apparatus powered on; and determining the wireless network apparatus whether to enter a second power-saving mode according to an information of a beacon received by the wireless network apparatus when the wireless network apparatus is operated in a link status. When the wireless network apparatus is detected to be operated in the non-link status, control the wireless network apparatus to enter the first power-saving mode by a power mode controlling circuit. The first power-saving mode is an inactive power-saving mode, and the second power-saving mode is a linked power-saving mode.

18 Claims, 6 Drawing Sheets

POWER MANAGING METHOD APPLIED TO A WIRELESS NETWORK APPARATUS AND POWER MANAGEMENT THEREOF

CROSS REFERENCE TO RELATED APPLICATIONS

This application claims the benefit of U.S. Provisional Application No. 61/040,155, which was filed on Mar. 28, 2008 and is incorporated herein by reference.

BACKGROUND OF THE INVENTION

1. Field of the Invention

The present invention relates to a power managing method and a related power management, and more particularly, to a power managing method applied to a wireless network apparatus and a related power management.

2. Description of the Prior Art

Recently, the popularity of computer and network facilities and reasonable price thereof promote the growth of local area networks (LAN). Network can connect the terminals at different locations and of different users, allowing the digital data to be delivered quickly and efficiently. More people can connect the computers and share a variety of message, information, and resources among each other. Especially in recent years, the development in the wireless local area network (WLAN) is able to lift the constraints of the network transmission lines on the terminals to allow the wireless terminals to have portable and mobile features, so as to provide the users network resources anytime and anywhere.

Power consumption is always an important issue for a portable device. The critical component for consuming power is the wireless network devices, such as a wireless network card consisting of a RF circuit and a baseband circuit. The conventional approach to save power for portable device is through manual manner by the user. However, such approach is inconvenient for the user and lacks efficiency.

SUMMARY OF THE INVENTION

In light of the descriptions above, it is therefore one of the objectives of the claimed invention to provide a power managing method applied to a wireless network apparatus and a related power management for dynamically adjusting the power consumption of the wireless network apparatus to solve the abovementioned problems.

It is therefore one of the objectives of the claimed invention to provide a power managing method applied to a wireless network apparatus and a related power management for automatically and actively adjusting the power consumption of the wireless network apparatus when the wireless network apparatus operated in a non-link status.

It is therefore one of the objectives of the claimed invention to provide a power managing method applied to a wireless network apparatus and a related power management for dynamically adjusting the power consumption of the wireless network apparatus according to an information of a beacon when the wireless network apparatus operated in a link status.

According to an exemplary embodiment of the present invention, a power managing method applied to a wireless network apparatus is provided. The wireless network apparatus is operated in a non-link status or a link status. The power managing method includes the steps of periodically detecting whether the wireless network apparatus is operated in a non-link status to determine whether to enter a first power-saving mode by a detecting unit when the wireless network apparatus powered on; and determining the wireless network apparatus whether to enter a second power-saving mode according to an information of a beacon received by the wireless network apparatus when the wireless network apparatus is operated in a link status. When the wireless network apparatus is detected to be operated in the non-link status, control the wireless network apparatus to enter the first power-saving mode.

According to an exemplary embodiment of the present invention, a power management for controlling a power mode of a wireless network apparatus is provided. The wireless network apparatus is operated in a non-link status or a link status. The power management includes a detecting unit and a power mode controlling unit. The detecting unit detects an operating status of the wireless network apparatus to generate a detecting result. The power mode controlling unit is coupled to the detecting unit for controlling the power mode of the wireless network apparatus according to the detecting result of the detecting unit. When the detecting result of the detecting unit indicates that the wireless network apparatus is operated in the non-link status, the power mode controlling unit controls the wireless network apparatus to enter a first power-saving mode. When the detecting result of the detecting unit indicates that the wireless network apparatus is operated in the link status, the power mode controlling unit controls the wireless network apparatus to enter a second power-saving mode according to an information of a beacon received by the wireless network apparatus.

DETAILED DESCRIPTION

The wireless network apparatuses mentioned in the following embodiments can be applied to any wireless communication products, e.g. wireless network cards and wireless base stations, but this should not be considered as limitations of the present invention and other electronic devices equipped with a wireless network interface and able to be connected to a wireless network can be adopted as well. The wireless network apparatus can build a connection with a WLAN AP or a workstation in the wireless LAN, so as to transmit and receive wireless signals for delivering data and message.

Figure 1:
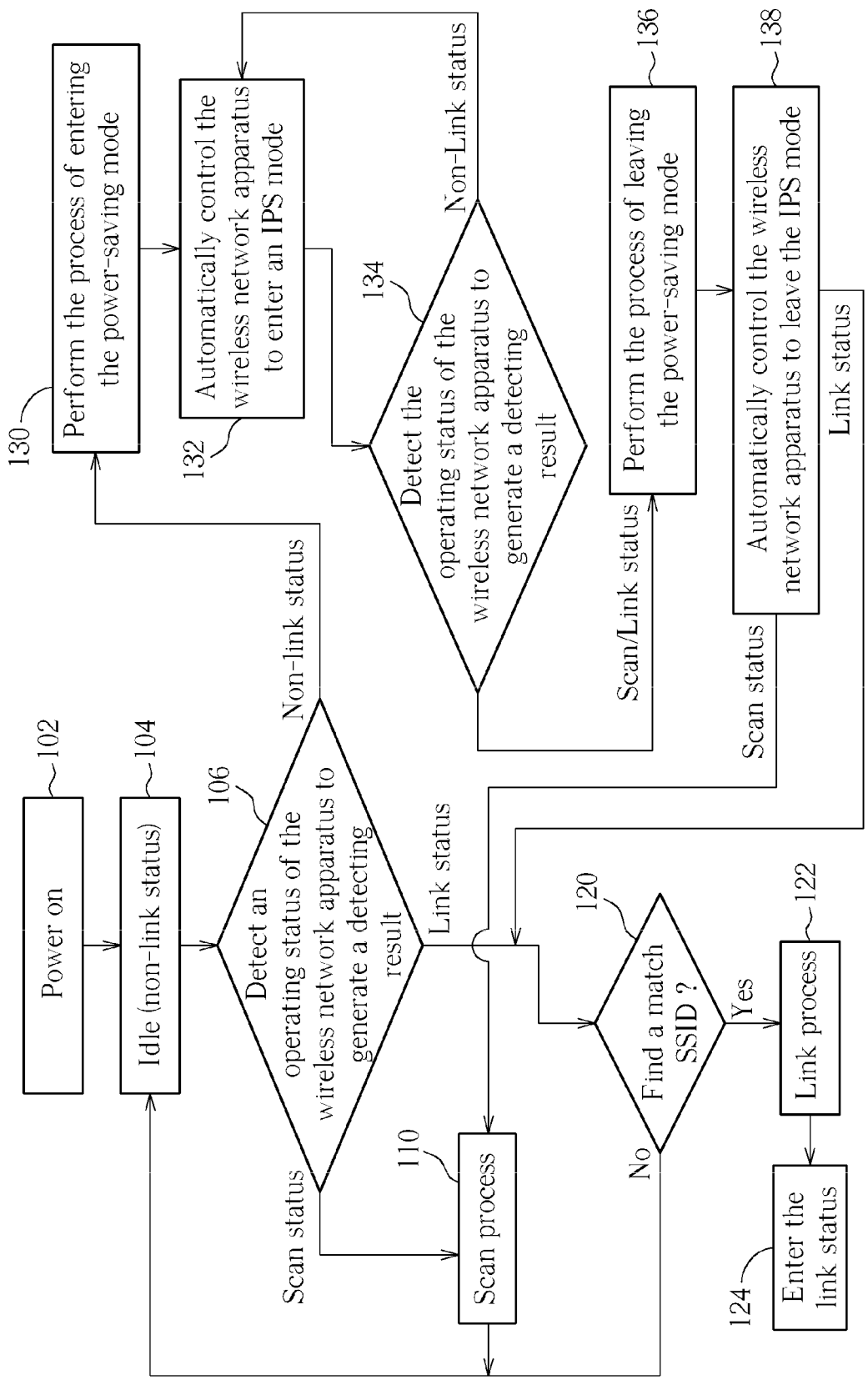
FIG. 1 is a flowchart illustrating a power managing method applied to a wireless network apparatus according to a first exemplary embodiment of the present invention.

Please refer to FIG. 1. FIG. 1 is a flowchart illustrating a power managing method applied to a wireless network apparatus according to a first exemplary embodiment of the present invention. Please note that the following steps are not limited to be performed according to the exact sequence shown in FIG. 1. Other steps or sequences with the identical results as FIG. 1 could also be performed. The method includes, but is not limited to, the following steps:

Step 102: Power on the wireless network apparatus.

Step 104: The wireless network apparatus is operated in the non-link status.

Step 106: Detect an operating status of the wireless network apparatus to generate a detecting result. When the detecting result indicates that the operating status is a scan status, go to Step 110; when the detecting result indicates that the operating status is a link status, go to Step 120; otherwise, go to Step 130.

Step 110: Perform a scan process. Go back to Step 104.

Step 120: Determine whether a match service set identifier (SSID) is found. If the match SSID is found, go to Step 122; otherwise, go back to Step 104.

Step 122: Perform a link process.

Step 124: Enter the link status.

Step 130: Perform the process of entering the power-saving mode.

Step 132: Automatically control the power consumption mode of the wireless network apparatus to enter an inactive power-saving (IPS) mode.

Step 134: Detect the operating status of the wireless network apparatus to generate a detecting result. When the detecting result indicates that the operating status is the scan status or the link status, go to Step 136; otherwise, go back to Step 132.

Step 136: Perform the process of leaving the power-saving mode.

Step 138: Automatically control the wireless network apparatus to leave the IPS mode. When the detecting result indicates that the operating status is the scan status, go back to Step 110; when the detecting result indicates that the operating status is the link status, go back to Step 120.

After the wireless network apparatus powered on (or radio on), the wireless network apparatus is operated in the idle mode (which is belonging to non-link status) (the steps 102~104). At this time, a detecting unit periodically detects the operating status of the wireless network apparatus and correspondingly generates the detecting result (Step 106). Next, there are three cases could be performed. In a first case, when the detecting result indicates that the operating status of the wireless network apparatus is a scan status, scan process will be performed (Step 110). In a second case, when the detecting result indicates that the operating status of the wireless network apparatus is a link status, link process will be performed (the steps 120~124). In a third case, when the detecting result indicates that the operating status of the wireless network apparatus is a non-link status, automatically/actively control the power consumption mode of the wireless network apparatus to enter the Inactive Power-Saving (IPS) mode by a power mode controlling circuit (the steps 130~132). The power mode controlling circuit could be implemented by software, firmware (such as Basic input/output system, BIOS) or hardware. In addition, after entering the IPS mode, automatically control the wireless network apparatus to leave the IPS mode if a command for performing the scan process or the link process received (the steps 134~138).

Please note that the operating status mentioned above is not limited to the present operating status of the wireless network apparatus, but further covers the status of the wireless network apparatus for the next time. For example, when the wireless network apparatus receives the commands to build a connection with the WLAN AP or the workstation, the detected operating status is belonging to the link status.

Figure 2:
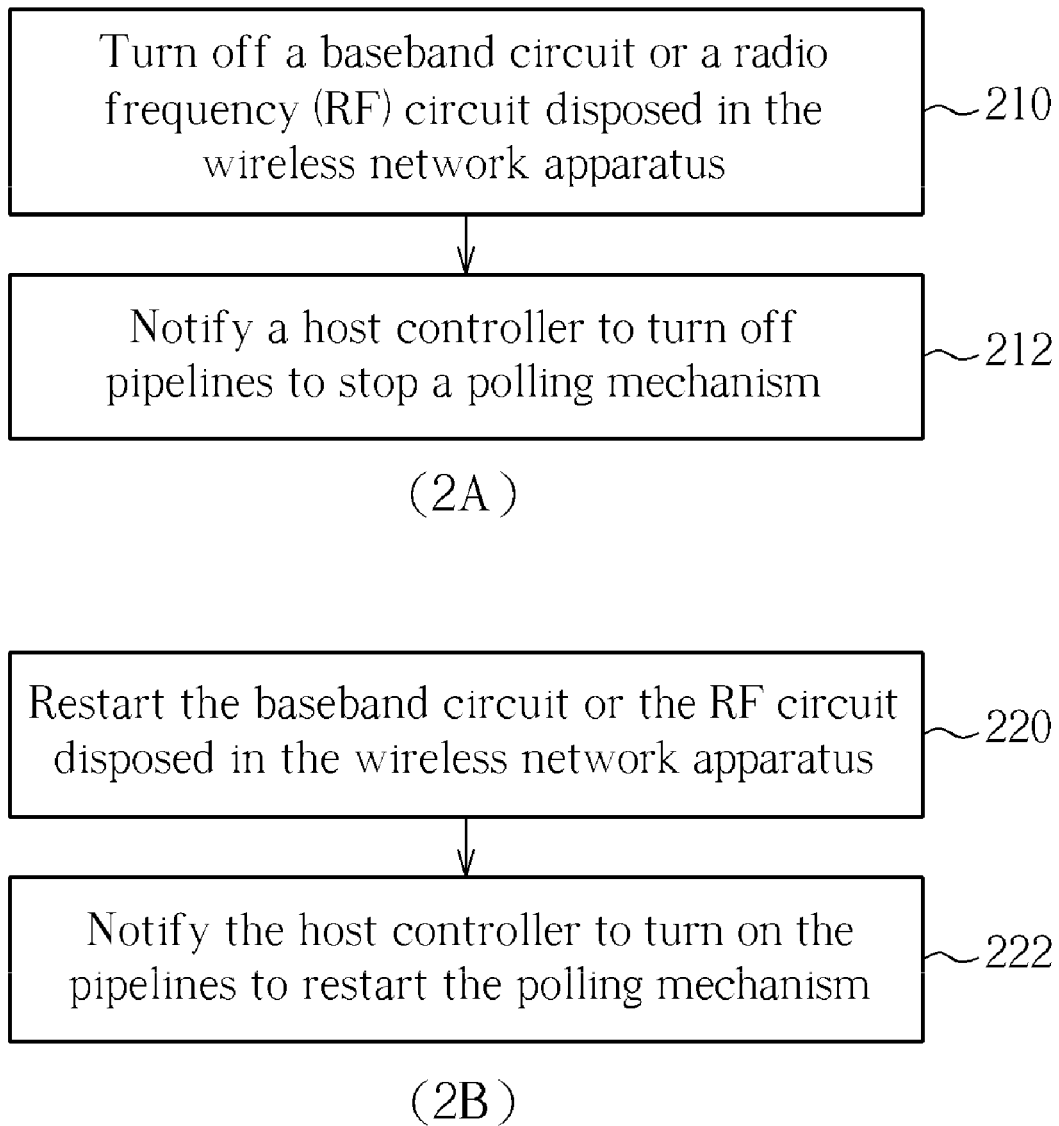
FIG. 2 (including 2A and 2B) is a flowchart illustrating the detailed steps of the step of entering the inactive power-saving mode and the step of leaving the inactive power-saving mode shown in FIG. 1.

The abovementioned embodiments are merely examples for illustrating features of the present invention and should not be seen as limitations of the present invention. As one skilled in the art will appreciate, the method shown in FIG. 1 can include other intermediate steps or several steps can be merged into a single step for suitable modifications without departing from the spirit of the present invention. For example, Step 132 and Step 138 can respectively include other detailed steps. Please refer to FIG. 2. FIG. 2 (including 2A and 2B) is a flowchart illustrating the detailed steps of the step of entering the inactive power-saving mode (i.e., Step 132) and the step of leaving the inactive power-saving mode (i.e., Step 138) shown in FIG. 1.

As shown in 2A, Step 132 shown in FIG. 1 further includes the following detailed steps;

Step 210: Turn off a baseband circuit or a radio frequency (RF) circuit disposed in the wireless network apparatus.

Step 212: Notify a host controller to turn off pipelines to stop a polling mechanism.

As shown in 2B, Step 138 shown in FIG. 1 further includes the following steps:

Step 220: Restart the baseband circuit or the RF circuit disposed in the wireless network apparatus.

Step 222: Notify the host controller to turn on the pipelines to restart the polling mechanism.

The abovementioned steps 210~212 and the steps 220~222 are presented merely for describing the present invention, not a limitation of the present invention. Those skilled in the art should appreciate that other manners capable of achieving the same goal of implementing the step of entering the inactive power-saving mode (i.e., Step 132) and leaving the inactive power-saving mode (i.e., Step 138) under obeying the spirit of the present invention can be adopted. It's noted that, after the wireless network apparatus enters the power-saving mode, the power consumption can be reduced only when the components like the baseband circuit and the RF circuit are turned off. In addition, if the wireless network apparatus is disposed in a USB device, another mechanism for notifying the host controller to turn off pipelines (such as BulkIN Pipe) to stop the polling mechanism is further disclosed in the present invention when entering the IPS mode. Therefore, optimum power-saving effect can be achieved.

Figure 3:
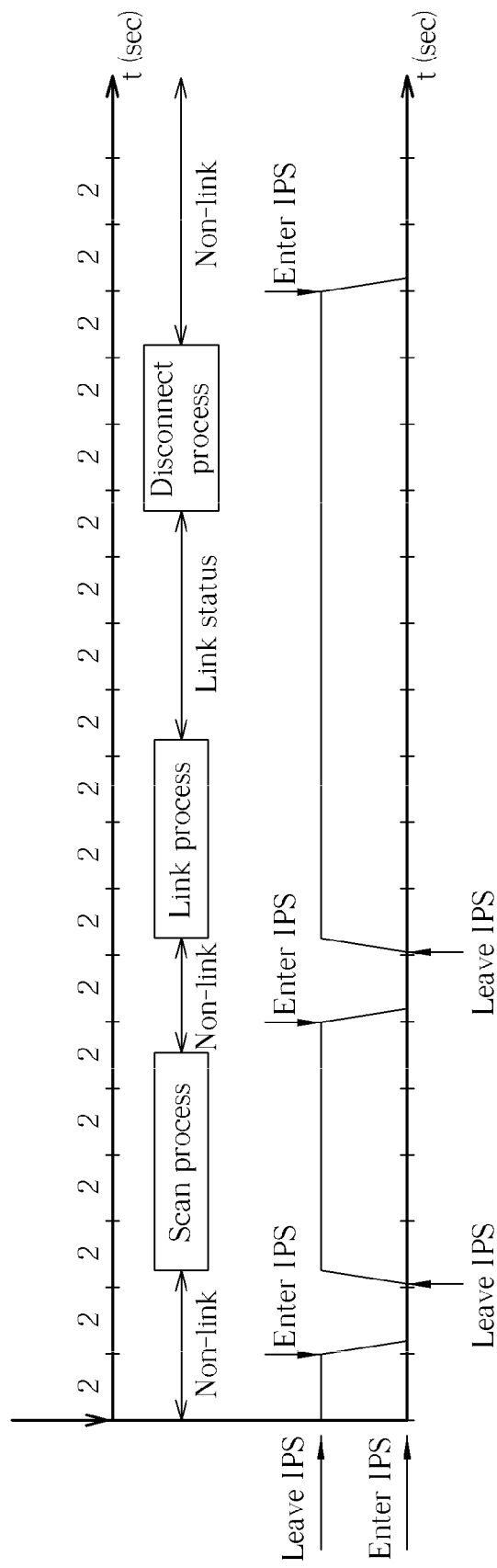
FIG. 3 is a diagram showing the timing points for entering and leaving the IPS mode shown in FIG. 1.

Please refer to FIG. 3. FIG. 3 is a diagram showing the timing points for entering and leaving the IPS mode shown in FIG. 1. As for the timing point of entering the IPS mode, the system (such as Basic input/output system, BIOS) will periodically detect whether the wireless network apparatus is operated in the non-link status to determine whether to enter the IPS mode after the wireless network apparatus powered on. In this embodiment, the detection is performed once every two seconds, but the present invention is not only limited to this embodiment. When the wireless network apparatus is operated in the non-link status (idle) and there are no demands for link operations or scan operations, the system will automatically control the wireless network apparatus to enter the IPS mode. If the timing point for confirmation is exactly during the period of performing scan process and link process, the system will not start the process of entering the IPS mode. In addition, after the wireless network apparatus has built the connection with the base-station or workstation (i.e., operated in the link status), the system will not perform the confirmation of whether to enter the IPS mode every two seconds. As for the timing point for leaving the IPS mode, the system will automatically control the wireless network apparatus to leave the IPS mode when the wireless network apparatus is operated in the IPS mode and the detecting result indicates that the operating status is the link status or the scan status.

The embodiments above are presented merely for describing features of the present invention, and should not be considered to be limitations of the present invention. Those skilled in the art should appreciate that various modifications of the timing point for entering and leaving the IPS mode may be made without departing from the spirit of the present invention can be adopted.

Figure 4:
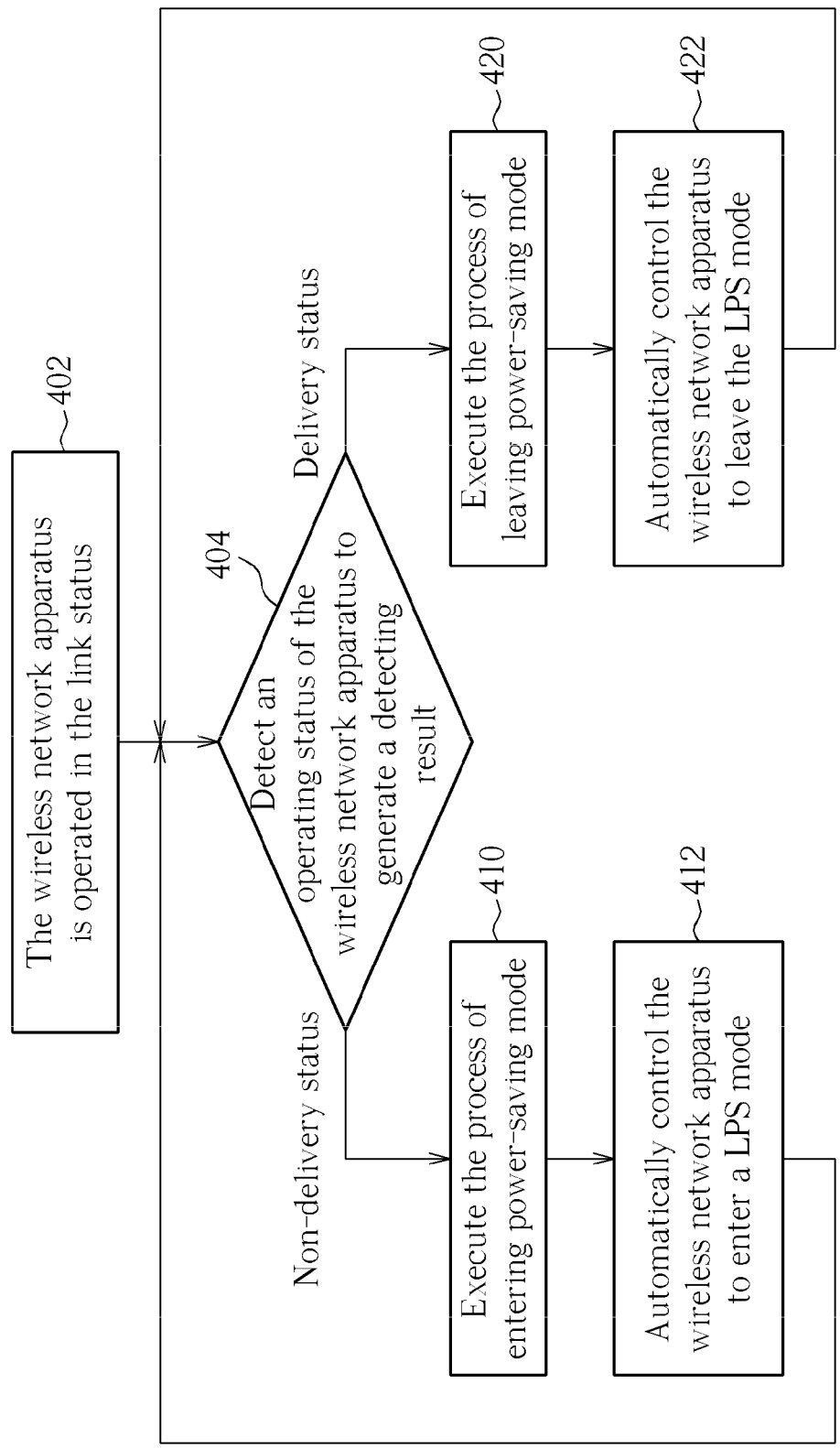
FIG. 4 is a flowchart illustrating a power managing method applied to a wireless network apparatus according to a second exemplary embodiment of the present invention.

However, the abovementioned IPS mode is merely a practicable embodiment of the present invention. In other embodiments, more power-saving mechanism can be implemented into the wireless network apparatus to achieve better power-saving effects. Please refer to FIG. 4. FIG. 4 is a flowchart illustrating a power managing method applied to a wireless network apparatus according to a second exemplary embodiment of the present invention. The method includes, but is not limited to, the following steps:

Step 402: The wireless network apparatus is operated in the link status.

Step 404: Detect an operating status of the wireless network apparatus to generate a detecting result. If the wireless network apparatus is operated in the link status and the detecting result indicates that the operating status is a non-delivery status, go to Step 410; otherwise, go to Step 420.

Step 410: Execute the process of entering power-saving mode.

Step 412: Automatically control the wireless network apparatus to enter a leisure power-saving (LPS) mode. Go back to Step 404.

Step 420: Execute the process of leaving power-saving mode.

Step 422: Automatically control the wireless network apparatus to leave the LPS mode. Go back to Step 404.

Figure 5:
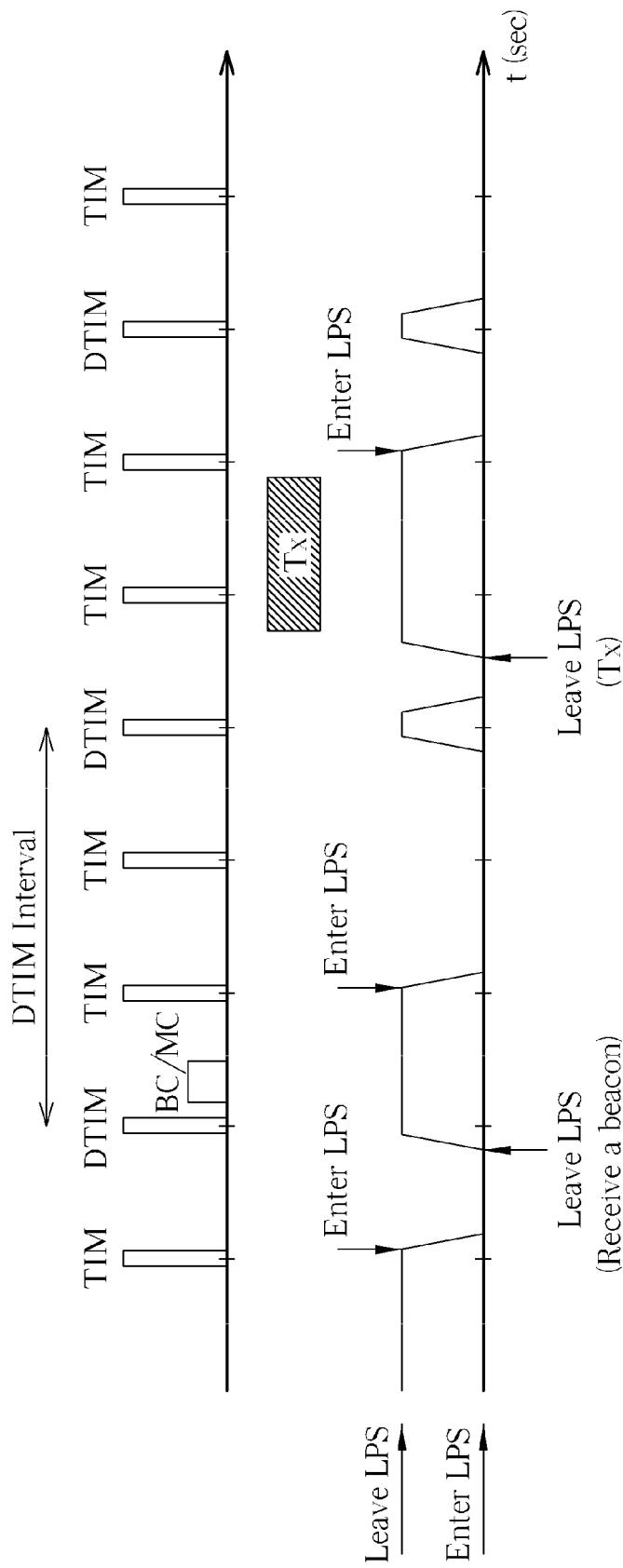
FIG. 5 is a diagram showing the timing points for entering and leaving the LPS mode shown in FIG. 4.

Please refer to FIG. 5. FIG. 5 is a diagram showing the timing points for entering and leaving the LPS mode shown in FIG. 4. In this embodiment, after the wireless network apparatus has built the connection between the base-station or the workstation, it can determine when to enter and leave the LPS mode according to an information of a beacon. The information of the beacon includes a traffic information message (TIM) element. The TIM can be further divided into two categories: TIM and DITM (delivery traffic information message), wherein only the DTIM carries information. Hence, the DTIM number or the DTIM interval included by the information fields of TIM element can be used for determining when to enter or leave the LPS mode. For example, after the wireless network apparatus finishes the operation of transmitting or receiving data, it then receives a beacon. At this time, if no data needs to be delivered, the system can automatically control the wireless network apparatus to enter the LPS mode. The timing point when to wake up the wireless network apparatus to receive the broadcast or multicast packets can be determined according to the DTIM number or the DTIM interval. Furthermore, if the wireless network apparatus is used as a receiver (Rx) or a transmitter (Tx), the system will automatically control the wireless network apparatus to leave the LPS mode since there is data to be transmitted or received.

Please also note that the abovementioned steps are not limited to be performed according to the exact sequence shown in the flowcharts above. As one skilled in the art will readily appreciate that appropriate modifications may be made without departing the spirit of the present invention.

Figure 6:
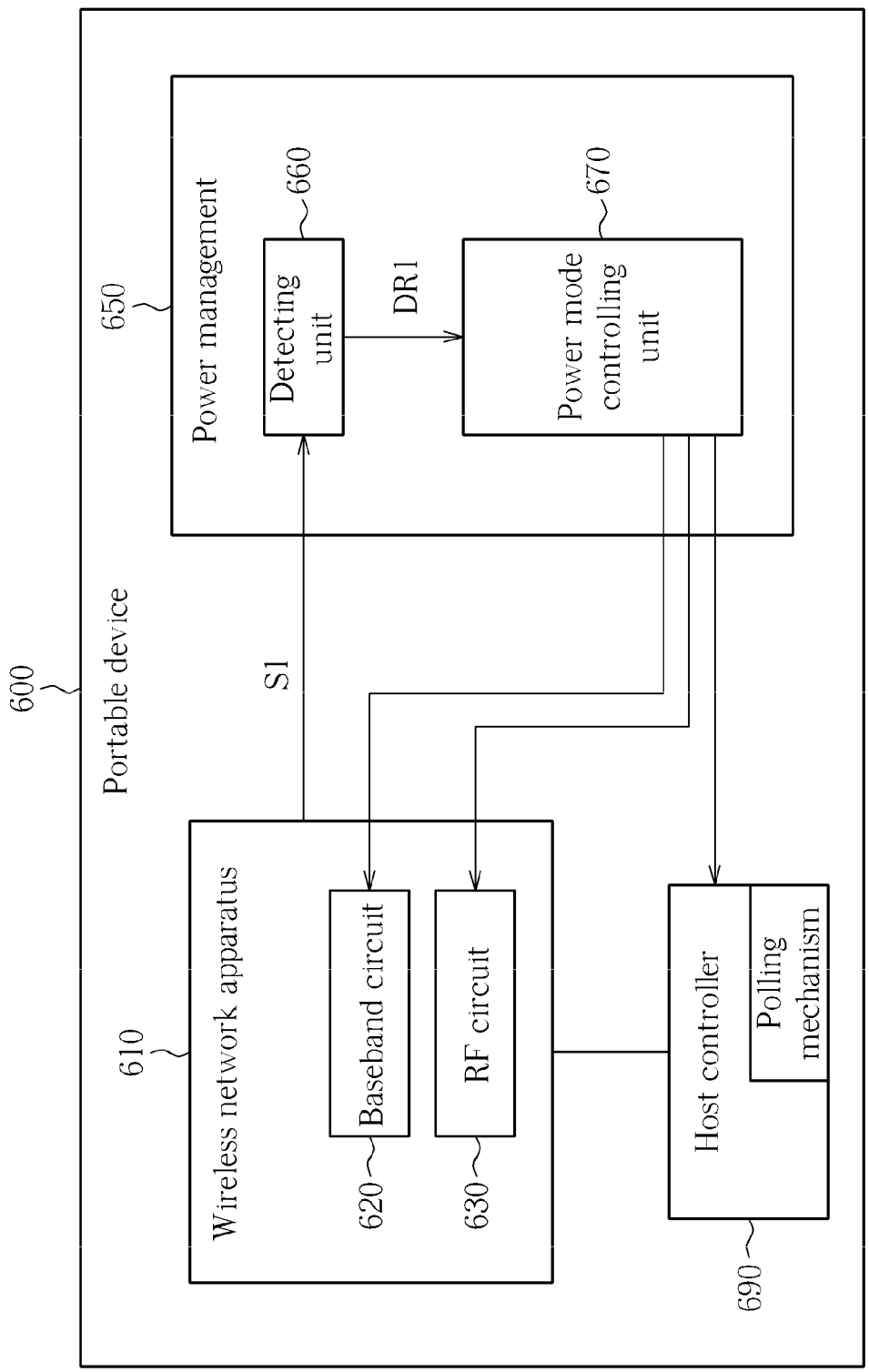
FIG. 6 is a diagram of a power management applied to a wireless network apparatus according to an embodiment of the present invention.

Please refer to FIG. 6. FIG. 6 is a diagram of a power management 650 applied to a wireless network apparatus 610 according to an embodiment of the present invention. In this embodiment, the wireless network apparatus 610 and the power management 650 are disposed inside a portable device 600, e.g. a notebook, but this should not be considered as limitations of the present invention and can be other electronic devices, e.g. a desktop computer. As shown in FIG. 6, the wireless network apparatus 610 includes a baseband circuit 620 and a RF circuit 630. The power management 650 includes a detecting unit 660 and a power mode controlling unit 670. The detecting unit 660 detects an operating status S1 of the wireless network apparatus 610 to generate a detecting result DR1. The power mode controlling unit 670 is coupled to the detecting unit 660 for automatically controlling the wireless network apparatus 610 to enter a power-saving mode (such as the IPS mode or the LPS mode) or leave the power-saving mode according to the detecting result DR1 from the detecting unit 660. The power consumption of the wireless network apparatus 610 entering the power-saving mode is smaller than that leaving the power-saving mode. In addition, when the wireless network apparatus 610 enters the IPS mode or the LPS mode, the power mode controlling unit 670 turns off power signals or clock signals of the baseband circuit 620 and/or the RF circuit 630 disposed in the wireless network apparatus 610. When the wireless network apparatus 610 leaves the IPS mode or the LPS mode, the power mode controlling unit 670 restarts the power signals or clock signals of the baseband circuit 620 and/or the RF circuit 630 disposed in the wireless network apparatus 610. If the wireless network apparatus 610 is disposed in a USB device, the power mode controlling unit 670 is further used for notifying a host controller 690 to turn off pipelines to stop a polling mechanism when the wireless network apparatus 610 enters the IPS mode or the LPS mode, and for notifying the host controller 690 to turn on the pipelines to restart the polling mechanism when the wireless network apparatus 610 leaves the IPS mode or the LPS mode.

In this embodiment, the power management 650 and the host controller 690 can be implemented by hardware or a firmware (such as BIOS). Furthermore, the power mode controlling unit 670 might turn off a part or all of the power signals/clock signals of low noise amplifiers (LNA), power amplifiers (PA), mixers, variable gain amplifiers, and filters disposed in the baseband circuit 620, or might turn off the power signals/clock signals of the modulators disposed in the baseband circuit 620 when the wireless network apparatus 610 enters the IPS mode or the LPS mode.

Please note that the wireless network apparatus 610 can be a wireless network card, but the present invention is not limited to this only and can be wireless network apparatuses of other types. Moreover, the details and operations of the components included by the wireless network apparatus 610 and the power management 650 have already been detailed in the embodiments above, and further detailed description is omitted herein for brevity.

The abovementioned embodiments are presented merely for describing the present invention, and in no way should be considered to be limitations of the scope of the present invention. In summary, the present invention provides a power managing method applied to a wireless network apparatus and a related power management. By detecting the operating status of the wireless network apparatus, the wireless network apparatus can be automatically controlled to enter or leave the power-saving mode, such as the IPS mode or the LPS mode. Therefore, the wireless network apparatus can enter the IPS mode to turn off the baseband circuit and the RF circuit if no link operation or scan operation is performed, thereby the power consumption can be reduced. The wireless network apparatus can also enter the LPS mode to save more power if the wireless network apparatus is operated in the link status while no data needs to be delivered. In addition, if the wireless network apparatus is disposed in a USB device, it can notify the host controller to stop the polling mechanism to save more power. Moreover, a goal of automatically saving power can be achieved by continuously detecting the operating status, which is convenient for the uses and can improve efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power managing method applied to a wireless network apparatus, the wireless network apparatus operated in a non-link status or a link status, the power managing method comprising:
   when the wireless network apparatus powered on, periodically detecting whether the wireless network apparatus is operated in the non-link status to determine whether to enter a first power-saving mode by a detecting unit; wherein when the wireless network apparatus is detected to be operated in the non-link status, controlling the wireless network apparatus to enter the first power-saving mode; and
   when the wireless network apparatus is operated in the link status, determining the wireless network apparatus whether to enter a second power-saving mode according to an information of a beacon received by the wireless network apparatus.

2. The method of claim 1, wherein the step of controlling the wireless network apparatus to enter the first power-saving mode further comprises:
   turning off a baseband circuit or a radio frequency (RF) circuit disposed in the wireless network apparatus.

3. The method of claim 1, wherein the wireless network apparatus is disposed in a universal serial bus (USB) device.

4. The method of claim 3, further comprising:
   notifying a host controller to stop a polling mechanism.

5. The method of claim 1, wherein the information is a delivery traffic information message (DTIM).

6. The method of claim 1, wherein the information is a DTIM number.

7. The method of claim 1, wherein the information is a DTIM interval.

8. The method of claim 1, wherein the first power-saving mode is an inactive power-saving mode; and the second power-saving mode is a linked power-saving mode.

9. The method of claim 1, wherein the detecting unit is implemented by a firmware.

10. A power management for controlling a power mode of a wireless network apparatus, the wireless network apparatus operated in a non-link status or a link status, the power management comprising:
    a detecting unit, for detecting an operating status of the wireless network apparatus to generate a detecting result; and
    a power mode controlling unit, coupled to the detecting unit, for controlling the power mode of the wireless network apparatus according to the detecting result of the detecting unit;
    wherein when the detecting result of the detecting unit indicates that the wireless network apparatus is operated in the non-link status, the power mode controlling unit controls the wireless network apparatus to enter a first power-saving mode; and
    when the detecting result of the detecting unit indicates that the wireless network apparatus is operated in the link status, the power mode controlling unit controls the wireless network apparatus to enter a second power-saving mode according to an information of a beacon received by the wireless network apparatus.

11. The power management of claim 10, wherein when the wireless network apparatus powered on, the detecting unit periodically detects whether the wireless network apparatus is operated in the non-link status to determine whether to enter the first power-saving mode.

12. The power management of claim 10, wherein when the wireless network apparatus enters the first power-saving mode, the power mode controlling unit turns off a baseband circuit or a RF circuit disposed in the wireless network apparatus.

13. The power management of claim 10, wherein the wireless network apparatus is disposed in a USB device.

14. The power management of claim 13, wherein when the wireless network apparatus enters the first power-saving mode, the power mode controlling unit notifies a host controller to stop a polling mechanism.

15. The power management of claim 10, wherein the information is a delivery traffic information message (DTIM).

16. The power management of claim 10, wherein the information is a DTIM number.

17. The power management of claim 10, wherein the information is a DTIM interval.

18. The power management of claim 10, wherein the first power-saving mode is an inactive power-saving mode; and the second power-saving mode is a linked power-saving mode.

* * * * *